Dec. 5, 1961 E. R. G. ECKERT 3,011,760
TRANSPIRATION COOLED TURBINE BLADE MANUFACTURED FROM WIRES
Filed Oct. 20, 1953

Inventor
ERNST R.G. ECKERT

United States Patent Office 3,011,760
Patented Dec. 5, 1961

3,011,760
TRANSPIRATION COOLED TURBINE BLADE MANUFACTURED FROM WIRES
Ernst R. G. Eckert, St. Paul, Minn., assignor, by mesne assignments, to the United States of America as represented by the Administrator of the National Aeronautics and Space Administration
Filed Oct. 20, 1953, Ser. No. 387,332
4 Claims. (Cl. 253—39.15)
(Granted under Title 35, U.S. Code (1952), sec. 266)

The invention described herein may be manufactured and used by or for the Government of the United States of America for governmental purposes without the payment of any royalties thereon or therefor.

This invention relates ot improvements in blades that in normal use are subjected to high centrifugal force loads and high heating conditions of operation.

A very effective method of cooling objects which are subject to very severe heating conditions, such as rocket nozzles or structural elements in gas turbines, was developed recently and is known as transpiration, effusion or sweat cooling. In such cooling the wall to be cooled is manufactured of a porous material and the coolant (gas or liquid) is directed through the pores toward the surface of the wall which is heated, for instance, by a hot gas stream. The coolant leaves the wall surface through the pores at that surface and builds a cooling film between the surface and hot gases.

The porous wall is usually made in such a way that granular powder is heated to temperatures which cause the single particles to sinter together. In using such material for sweat cooled turbine blades, the following difficulty arises: the rotating blades, the cooling of which is especially important, are subject to high centrifugal stresses. Porous material consisting of more or less spherical particles connected at the points where they touch each other is by the nature of its structure not suited to give high strength against tensile stresses. Accordingly, an object of this invention is to provide a blade that is capable of carrying out transpiration cooling methods but yet, is strong enough to withstand the stresses usually encountered in high rotational speed turbine blades.

A more specific object of the invention is to provide a turbine blade with a body consisting of a plurality of wires made of metal, ceramic or other materials, and arranged with their longitudinal axes generally and not necessarily precisely, parallel to the blade axis, either with or without a stiffener insert, whereby ample porosity is provided for transpiration cooling and yet, with the axes of the blade fibres or wires arranged as described, ample strength to withstand centrifugal forces is present.

Other objects and features will become apparent in following the description of the illustrated forms of the invention.

Figure 1:
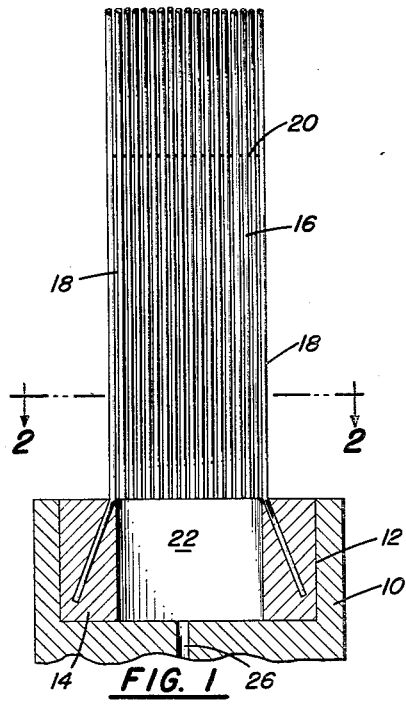
FIG. 1 is vertical sectional view of one form of the invention and taken substantially on the line 1—1 of FIG. 2 and in the direction of the arrows.
Figure 2:
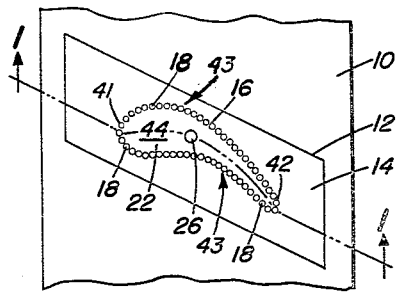
FIG. 2 is a transverse sectional view of the blade of FIG. 1 and taken on the line 2—2 of FIG. 1.

In order to carry forward the transpiration technique for cooling engine parts that are subjected not only to severe heat conditions but also high mechanical stress, for example, turbine blades, a new concept of blade construction has been obtained. In the drawing several embodiments of this concept are illustrated. In FIGS. 1 and 2 there is a fragment of a turbine wheel 10 provided with one of a plurality of pockets 12 accommodating blade base 14 held in place by any known means. Blade body 16 is made of a plurality of wires 18 extending generally parallel to each other and to the longitudinal axis of the blade. The inner ends of the wires are embedded or otherwise fixed to base 14, and the wires are arranged to form a blade (FIG. 2) leading edge 41, trailing edge 42, and two cambered surfaces 43 connecting the leading with the trailing edge. The wires are spaced slightly from each other and are preferably connected together, as by welding 20 or other suitable means.

For obtaining proper transpiration cooling, the center of the blade is hollow, as shown in FIG. 2 and has a main passage 44 therein in communication with the spaces between wires 18. Opening into the passage 44 of the blade body 16 is an aperture 22 in base 14, the aperture 22 conducting coolant supplied through turbine wheel 10, as by passing through passageway 26.

Figure 3:
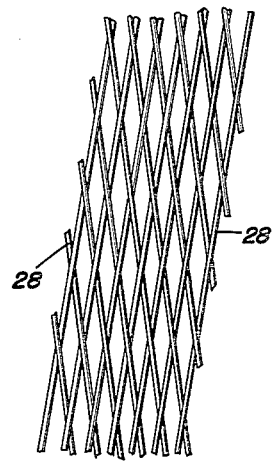
FIG. 3 is a fragmentary enlarged elevational view of a modification of the invention.
Figure 4:
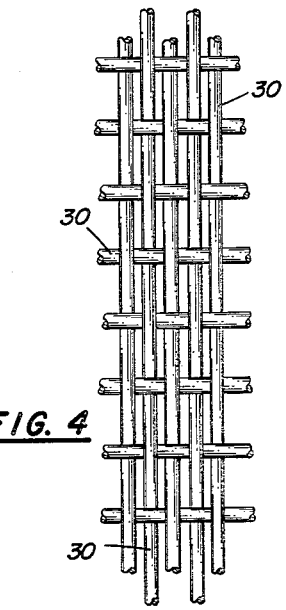
FIG. 4 is a fragmentary enlarged elevational view of another modification.

In FIG. 3 another form of blade is shown, differing from that of FIG. 1 in that the wires 28 are in a woven pattern, while FIG. 4 illustrates a modification of the woven pattern in the crossing of wires 30 at right angles to each other. In either case and also that of FIG. 1 the blade body 16 formed by the wires has its wires arranged with a number of spaces therein through which coolant fluid may pass.

Figure 5:
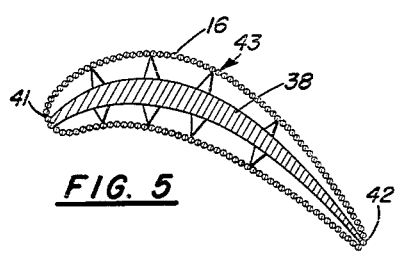
FIG. 5 is a transverse sectional view of the blade, showing the use of an insert for stiffening the blade, the use of an insert being optional with any embodiment.

In some instances stiffening of the blade may be required, making necessary the use of a stiffener 38 in the passage 44. The stiffener may be used with any or all of the blade body patterns as shown in FIGS. 1, 3, and 5 and is preferably secured to the surfaces 43 and/or edges 41 and 42 of the blades.

In operation of a turbine, the main stresses in a rotating blade thereof are the centrifugal stresses which act in a direction normal to the axis of rotation. This direction coincides usually with the direction of the blade axis (span) and therefore, it is sufficient for the material from which the blade body is made to have high tensile strength in one direction. A porous material of such characteristic can be obtained when it is composed of wires or threads of metal, glass quartz or other ceramics arranged in the way described hereinbefore. Thus, where the term "wire" is used, this term is not to be limited in interpretation to metal wires, but means also wire made of any material suitable to carry out the invention. The porous material used for transpiration cooling heretofore consists more or less of spherical particles connected at the points where they touch each other and therefore, by nature, is not strong enough in tension to withstand the centrifugal loads imposed upon turbine blades.

If centrifugal stresses alone were present it would be sufficient to have the wires running parallel to each other as shown in FIG. 1 and even the interconnections at 20 would be unnecessary. There are bending forces to contend with, but even under severe turbine operating conditions, the bending forces, which are caused by the deflection of the gas stream passing the blades, are only about one tenth of the centrifugal forces. A slight inclination of the wires from the radial direction and/or connection of the wires will compensate for these forces. In reality, the gas flow along the outside of the blade causes pressure differences around the blade cross-section. These pressure differences would deform such a blade. Thus, some interconnection of the wires of the blades is desirable for producing a more satisfactorily operative blade. Examples of such interconnection are shown in FIGS. 3 and 4. Moreover, to have the desired coolant flow distribution the blades may be built up of several layers of wire.

It is understood that known practices and techniques may be used to produce the described invention, and that various modifications and variations as fall within the scope of the claims may be made without departing from the protection thereof.

What is claimed is:

1. A hollow turbine blade comprising a base adapted to be connected to a turbine wheel, a plurality of wires connected to said base and having their axes extending generally parallel to each other and away from said base, said wires defining by their relative positions the upper and lower cambers and leading and trailing edges of said hollow turbine blade, said wires having spaces therebetween to provide for transpiration cooling of the blade, and said base having an aperture therethrough to conduct cooling fluid through said base and into said hollow blade whereby said cooling fluid is supplied to said spaces and flows therethrough to the exterior of said blade.

2. A turbine blade comprising a base adapted to be connected to a turbine wheel, a first plurality of wires connected to said base and having their axes extending generally parallel to each other and away from said base, said first plurality of wires defining by their relative positions the shell of said turbine blade, said first plurality of wires having spaces therebetween, a second plurality of wires interconnected with said first plurality of wires and extending generally transverse thereto, and means to conduct cooling fluid through said base and into said blade whereby said cooling fluid is supplied to said spaces to provide transpiration cooling of said blade.

3. A turbine blade comprising a base adapted to be connected to a turbine wheel, a first plurality of wires connected to said base and having their axes extending generally parallel to each other and away from said base, said first plurality of wires defining by their relative positions the shell of said turbine blade, said first plurality of wires having spaces therebetween, a second plurality of wires interconnected with said first plurality of wires and extending generally transverse thereto, means to conduct cooling fluid through said base and into said blade whereby said cooling fluid is supplied to said spaces to provide transpiration cooling of said blade, and a stiffener disposed within and connected to said shell of said turbine blade.

4. A turbomachine blade consisting of: a hollow porous shell structure having aerofoil profile; said hollow shell structure having opposed faces and formed of a first plurality juxtapositioned wires having their axes extending generally parallel to each other and having spaces therebetween, a second plurality of juxtapositioned wires generally parallel to each other and having spaces therebetween, and in contact with and interconnected with said first plurality of wires and extending in angular relation thereto, whereby cooling fluid supplied to the interior of said hollow shell structure will pass through said spaces for transpiration cooling of said blade.

References Cited in the file of this patent

UNITED STATES PATENTS

| | | |
|---|---|---|
| 2,509,376 | Trask | May 30, 1950 |
| 2,509,377 | Trask | May 30, 1950 |
| 2,529,946 | Imbert | Nov. 14, 1950 |
| 2,699,598 | Daugherty | Jan. 18, 1955 |
| 2,720,356 | Erwin | Oct. 11, 1955 |
| 2,774,566 | Richardson | Dec. 18, 1956 |

FOREIGN PATENTS

| | | |
|---|---|---|
| 235,304 | Great Britain | June 12, 1925 |
| 619,634 | Great Britain | Mar. 11, 1949 |
| 619,722 | Great Britain | Mar. 14, 1949 |
| 715,421 | Germany | Dec. 20, 1941 |
| 924,012 | France | Mar. 3, 1947 |
| 1,007,303 | France | Feb. 6, 1952 |